(12) United States Patent
Unsworth et al.

(10) Patent No.: US 7,878,471 B2
(45) Date of Patent: Feb. 1, 2011

(54) SUPPORT FOR ASSEMBLY WITH FLAT PANEL VIDEO MONITORS, COUPLER FOR ATTACHMENT OF THE SUPPORT TO AN EXTENSION ARM, AND ASSEMBLY METHODS

(75) Inventors: Austin Everett Unsworth, Fort Mill, SC (US); Gary DeCarr, Charlotte, NC (US); Nathan Hemmer, Rock Hill, SC (US)

(73) Assignee: Dental Equipment, LLC, Charlotte, NC (US)

( * ) Notice: Subject to any disclaimer, the term of this patent is extended or adjusted under 35 U.S.C. 154(b) by 0 days.

(21) Appl. No.: 11/867,604

(22) Filed: Oct. 4, 2007

(65) Prior Publication Data

US 2009/0090824 A1    Apr. 9, 2009

(51) Int. Cl.
*E04G 3/00* (2006.01)
(52) U.S. Cl. ...................... 248/278.1; 248/919; 248/921
(58) Field of Classification Search .............. 248/278.1, 248/317, 183.1, 918–919, 921–923; 312/223.1; 361/681, 679.21, 679.22, 679.26
See application file for complete search history.

(56) References Cited

U.S. PATENT DOCUMENTS 5,768,096 A * 6/1998 Williams et al. ............ 361/681
6,758,454 B2 * 7/2004 Smed ........................ 248/314
6,899,442 B2 * 5/2005 Howell et al. ............... 362/147
2006/0186295 A1 * 8/2006 Dittmer et al. ........... 248/284.1
2007/0041213 A1 * 2/2007 Short et al. ................. 362/561

FOREIGN PATENT DOCUMENTS

WO    2009/045222 A1    4/2009

OTHER PUBLICATIONS

International Search Report for International Application No. PCT/US07/080632, dated Sep. 9, 2008, 3 pages.
Written Opinion of the International Searching Authority for Application No. PCT/US07/80632, dated Sep. 9, 2008, 5 pages.

* cited by examiner

*Primary Examiner*—Gwendolyn Baxter
(74) *Attorney, Agent, or Firm*—TraskBritt

(57) ABSTRACT

A unitary support for a flat panel video monitor includes a yoke that may be attached to a back side of the monitor in two or more different orientations, and handles extending from opposite side ends of the yoke. The handles may extend diagonally from the side ends of the yoke, imparting the support with a general appearance of the letter "W." The yoke is also configured to be secured directly to a coupler at the end of an extension arm. A coupler attachment element of the yoke and a support attachment element of the coupler may have engagement features that are configured complementarily to each other to prevent undesired movement of the support relative to the coupler and the extension arm. The complementary engagement features may also enable attachment of the coupler to the support in two or more discrete orientations.

9 Claims, 9 Drawing Sheets

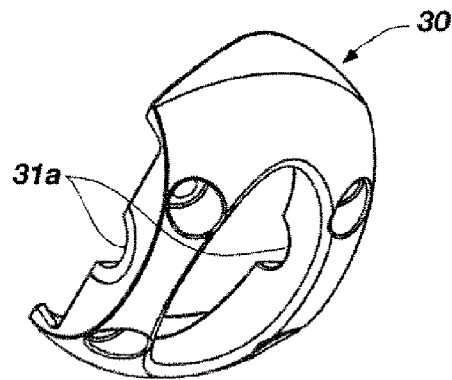
*FIG. 4A*
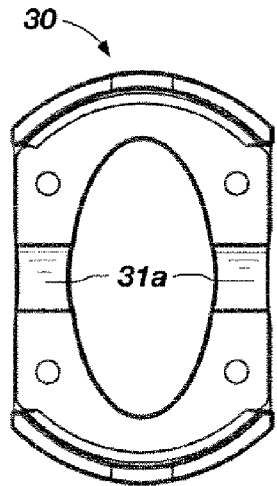 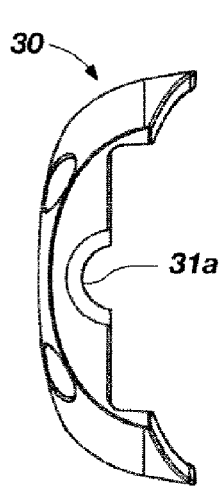 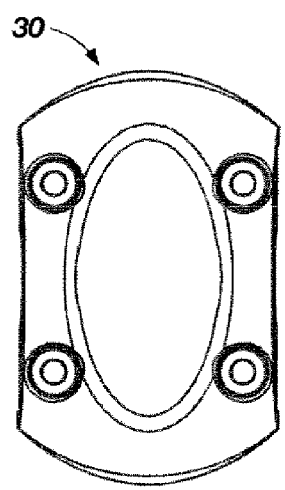
*FIG. 4B*     *FIG. 4C*     *FIG. 4D*
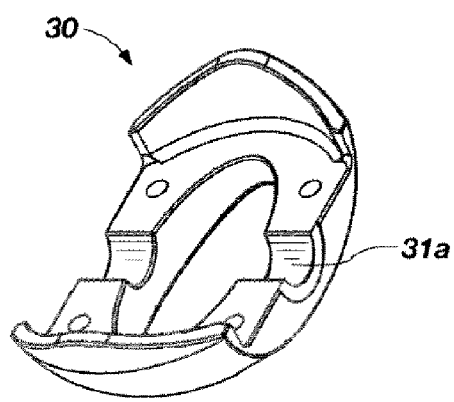 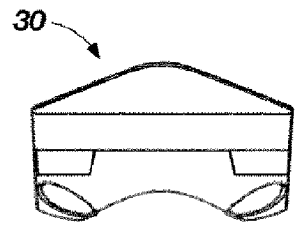
*FIG. 4E*     *FIG. 4F*

SUPPORT FOR ASSEMBLY WITH FLAT PANEL VIDEO MONITORS, COUPLER FOR ATTACHMENT OF THE SUPPORT TO AN EXTENSION ARM, AND ASSEMBLY METHODS

FIELD OF INVENTION

The present invention relates generally to apparatus for supporting flat panel video monitors, such as computer monitors and televisions. More specifically, the present invention relates to supports and couplers that are parts of support assemblies for flat panel video monitors, which enable users to readily position flat panel video monitors at a plurality of locations.

BACKGROUND OF RELATED ART

A variety of apparatus have been developed to support flat panel video monitors. Among these apparatus are assemblies that facilitate movement of flat panel video monitors to a large number of locations, sometimes in different orientations. Such assemblies have found increased use in a number of settings, including operating rooms, dental offices, and doctor offices, where ready movement of a monitor is desirable, particularly since the individuals (e.g., hygienist, dentist, patient, etc.) who may need to view the monitor may be present in different locations throughout a room, as well as have differently oriented lines of sight (e.g., a hygienist or dentist may be sitting or standing facing a patient, a patient may be sitting upright, reclined, or lying down, typically face-forward, etc.).

While some state-of-the art support assemblies enable movement of monitors to a large number of locations and orientations, they are relatively complex devices that are difficult to assemble, and sometimes difficult to use.

Accordingly, there is a need for an easy-to-assemble and easy-to-use monitor support assembly that may readily and easily position a monitor in a multitude of desired positions and orientations.

SUMMARY

In one aspect, the present invention includes a support for a flat panel video monitor. A support that incorporates teachings of the present invention includes a yoke and at least one position manipulation handle protruding from a side of the yoke. In some embodiments, a support may include two position manipulation handles on opposite side ends of the yoke. The yoke can be configured to be rigidly secured to a back side of a flat panel video monitor. Additionally, the yoke can be configured to be coupled to an elongate extension arm, which is, in turn, permanently mounted to a support surface (e.g., a wall, a countertop, a ceiling, etc.).

When a flat panel video monitor is secured to the yoke, at least a portion of each position manipulation handle protrudes beyond an outer peripheral edge of the video monitor. Each handle may be oriented in such a way that, when grasped by the hand of a user, the user may move the monitor along or about any axis, constrained only by the physical and mechanical limitations of the elongate extension arm to which the support is coupled. Without limiting the scope of any aspect of the present invention, the handles may protrude diagonally upward and outward from the yoke and the outer side edges of the video monitor.

In some embodiments, a support for a video monitor according to the present invention is a substantially unitary element. Such a support may be supplied to a consumer as a one-piece unit, which must merely be secured to the back side of a video monitor and coupled to an extension arm. Thus, in another aspect, the present invention includes a method for assembling a flat panel video monitor to a support, with the method consisting essentially of rigidly securing the support to the back side of the video monitor.

In another aspect, the present invention includes a coupler for securing a support for a video monitor to an elongate extension arm. A coupler according to the present invention, which may be coupled to an elongate support arm in any suitable manner (e.g., pivotally, about a single axis), may be rigidly secured to the support. The coupler may be configured for attachment to the support in two or more (e.g., perpendicular) discrete orientations.

According to another aspect, a coupler of the present invention may provide for movement of a flat panel video monitor about two axes of rotation. A first axis of rotation extends through the coupler itself and, depending upon the orientation of a hinge that is held in place by the coupler, may provide for side-to-side tilting of the video monitor relative to the coupler, or for top-to-bottom tilting of the video monitor. A second axis is defined by a joint between the coupler and an extension arm, in which the joint may be configured to rotate relative to an end of the extension arm. In some embodiments, in which the joint comprises a substantially linear element, rotation of the joint relative to the end of the extension arm (e.g., by grasping one or both handles of a support for a flat panel video monitor) may provide for rotation of the flat panel video monitor about a fixed axis, such as when a change between a portrait and landscape orientation of the monitor is desired. In other embodiments, in which the joint between the coupler and the extension arm is bent (e.g., at an angle of about 45°, about 90°, etc.), rotation of the joint relative to the extension arm may provide for wider, swinging movement of a flat panel video monitor along an arc, rather than about a fixed axis.

Other features and advantages of the present invention will become apparent to those in the art through consideration of the ensuing description, the accompanying drawings, and the appended claims.

BRIEF DESCRIPTION OF THE DRAWINGS

In the drawings, which depict various embodiments of features of a support assembly for a flat panel video monitor:

FIGS. 4A through 4F are various views of another embodiment of a coupler of the assembly shown in FIGS. 1 through 3;

DETAILED DESCRIPTION

Figure 1:
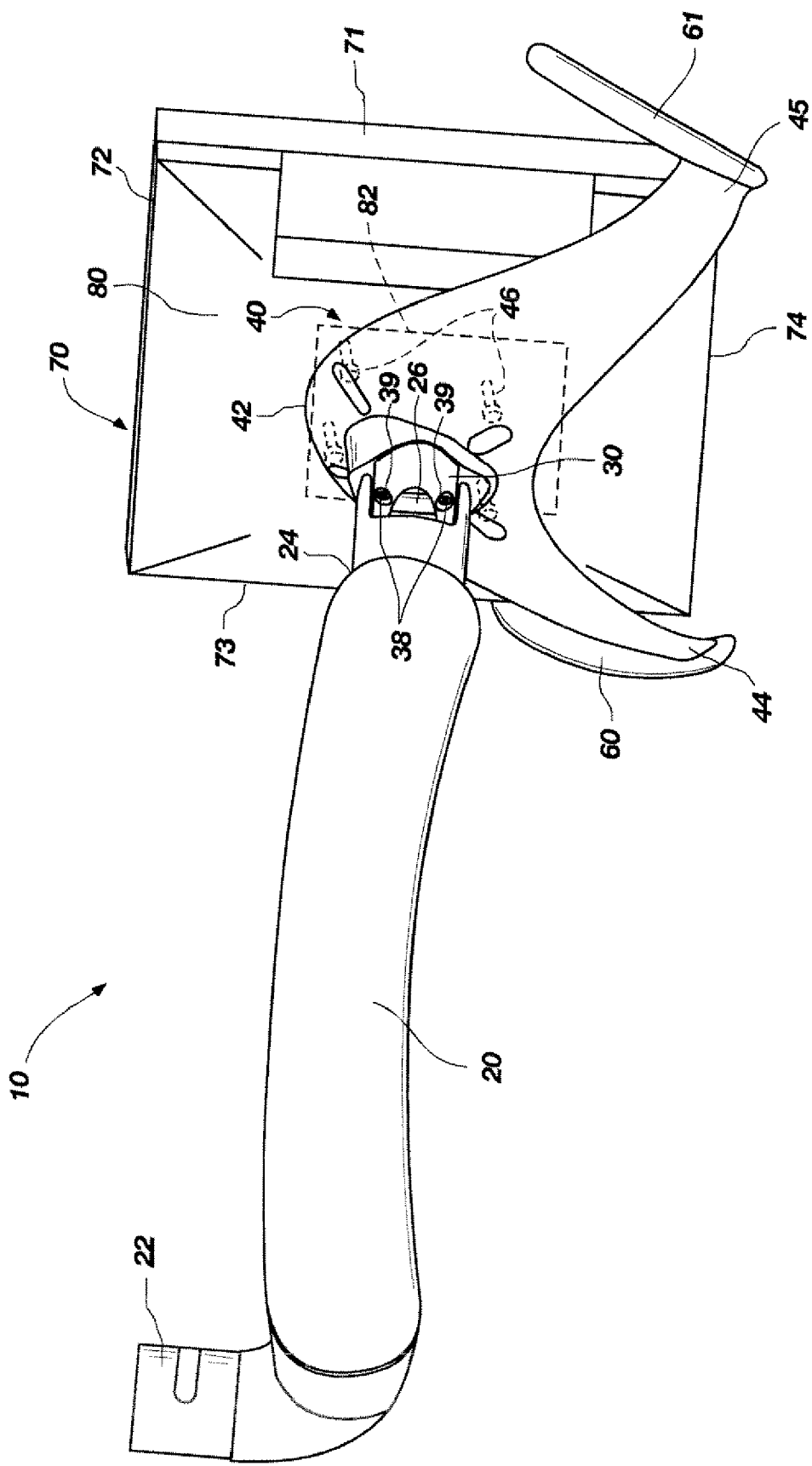
FIG. 1 is a perspective view of a particular embodiment of a support assembly that incorporates teachings of the present invention.

Referring to FIG. 1, a portion of a support assembly 10 for a flat panel video monitor 70 is illustrated. Support assembly 10 includes a support 40 for carrying flat panel video monitor 70, a coupler 30 secured to support 40, and an extension arm 20 secured or associated with coupler 30.

In the illustrated embodiment, extension arm 20 is an elongate element that includes a first end 22 and an opposite second end 24. First end 22 is configured to be secured to a mount (not shown), which may be secured in a fixed position to a desired location, such as a countertop, wall, ceiling, or other suitable location. Coupler 30 is connected to second end 24 of extension arm 20.

Figure 2A:
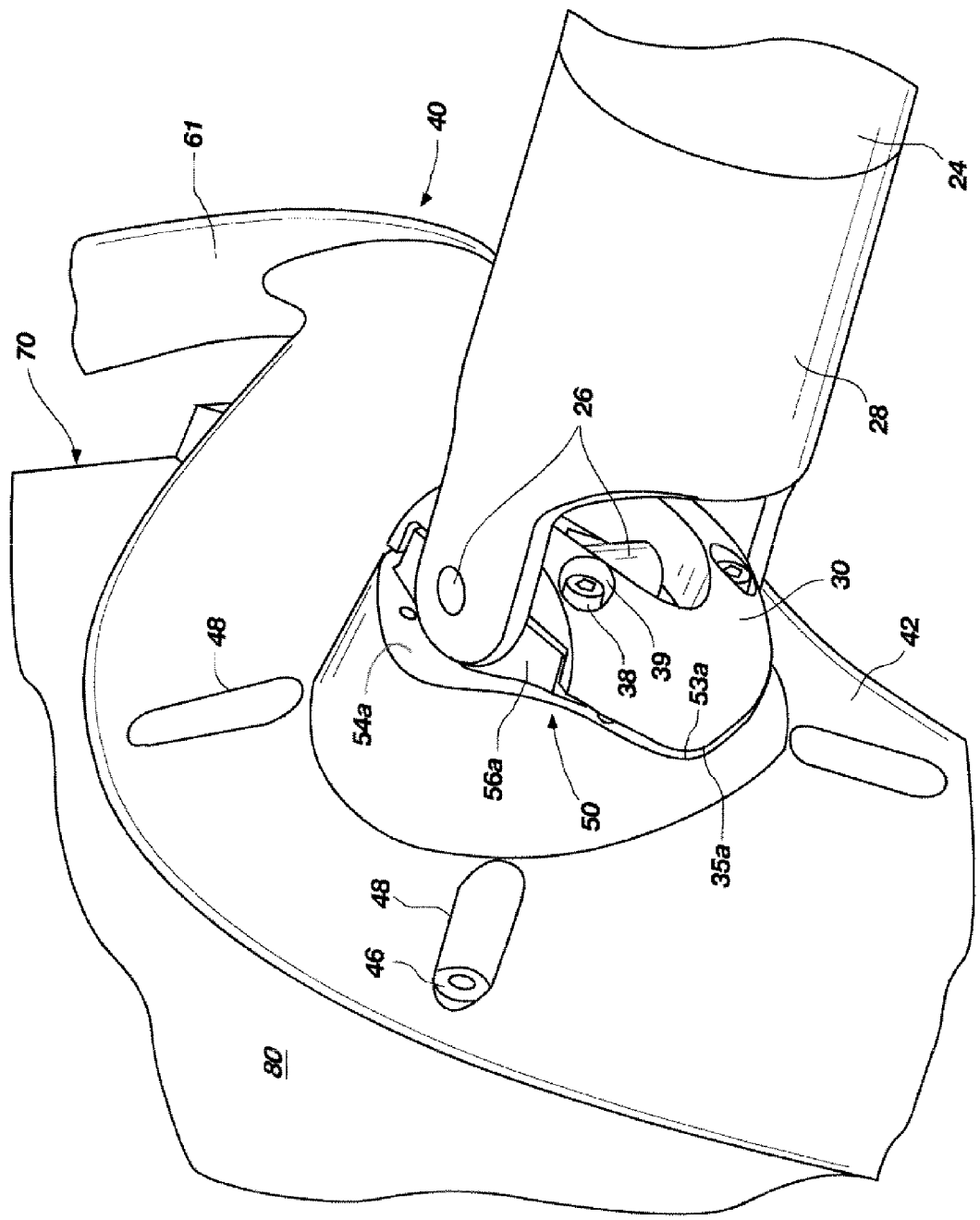
FIG. 2A is an enlarged perspective view of a portion of the assembly shown in FIG. 1, illustrating an orientation in which a support of the assembly may be coupled to an extension arm.
Figure 2B:
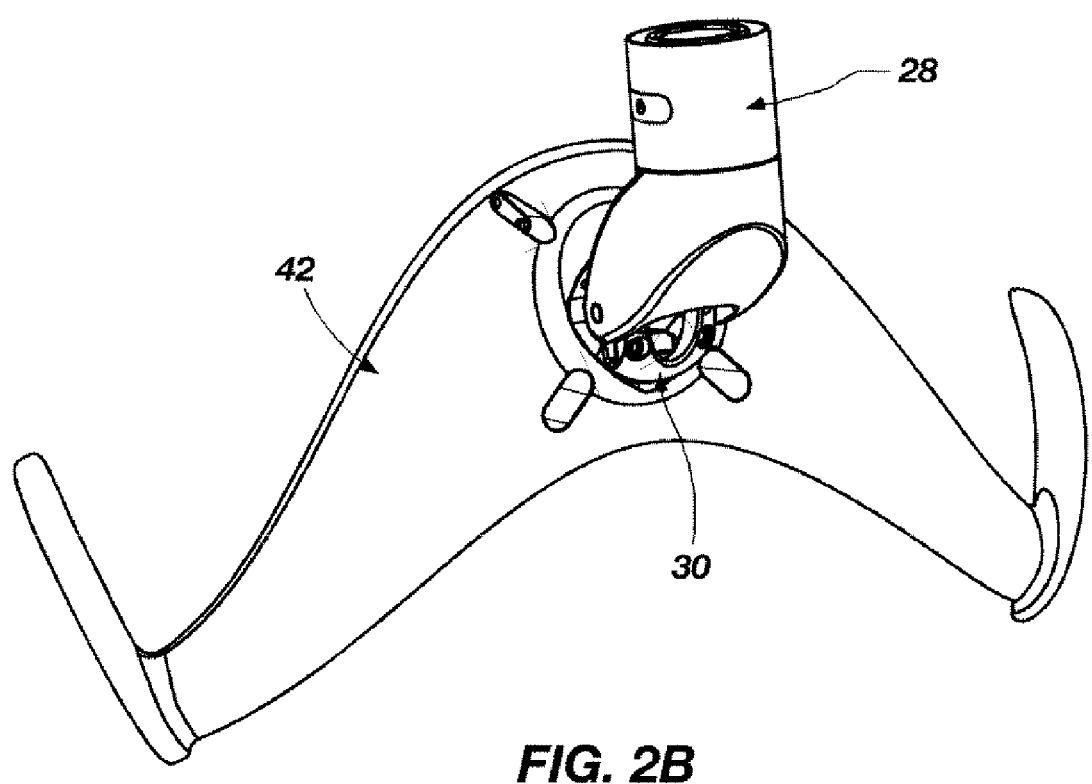
FIG. 2B and 2C are perspective views of a variation of the assembly shown in FIGS. 1 and 2A through 2C, in which a joint between the extension arm and the coupler that attaches the support to the extension arm is bent (e.g., at an angle) rather than substantially straight.
Figure 2C:
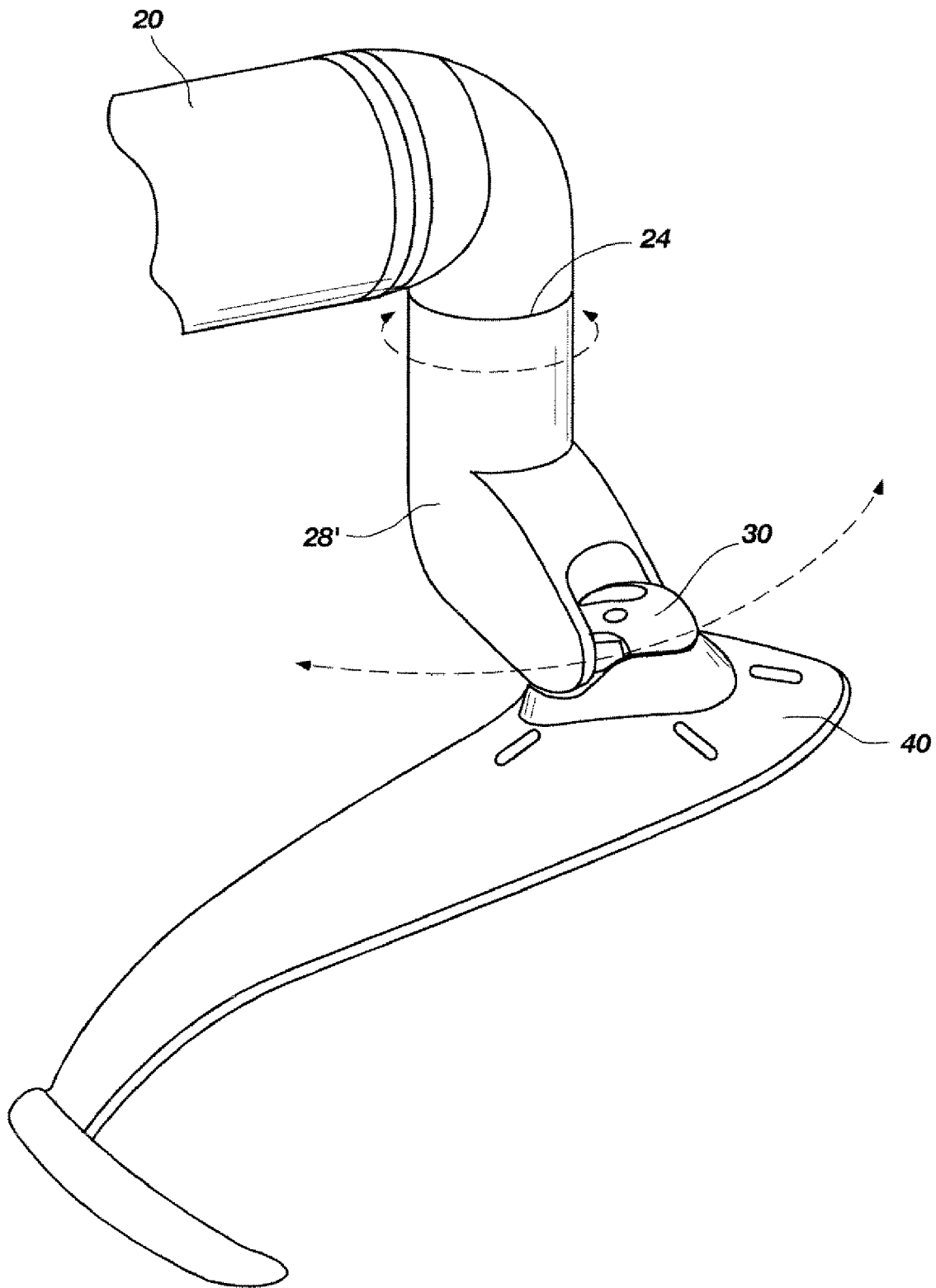
Figure 3:
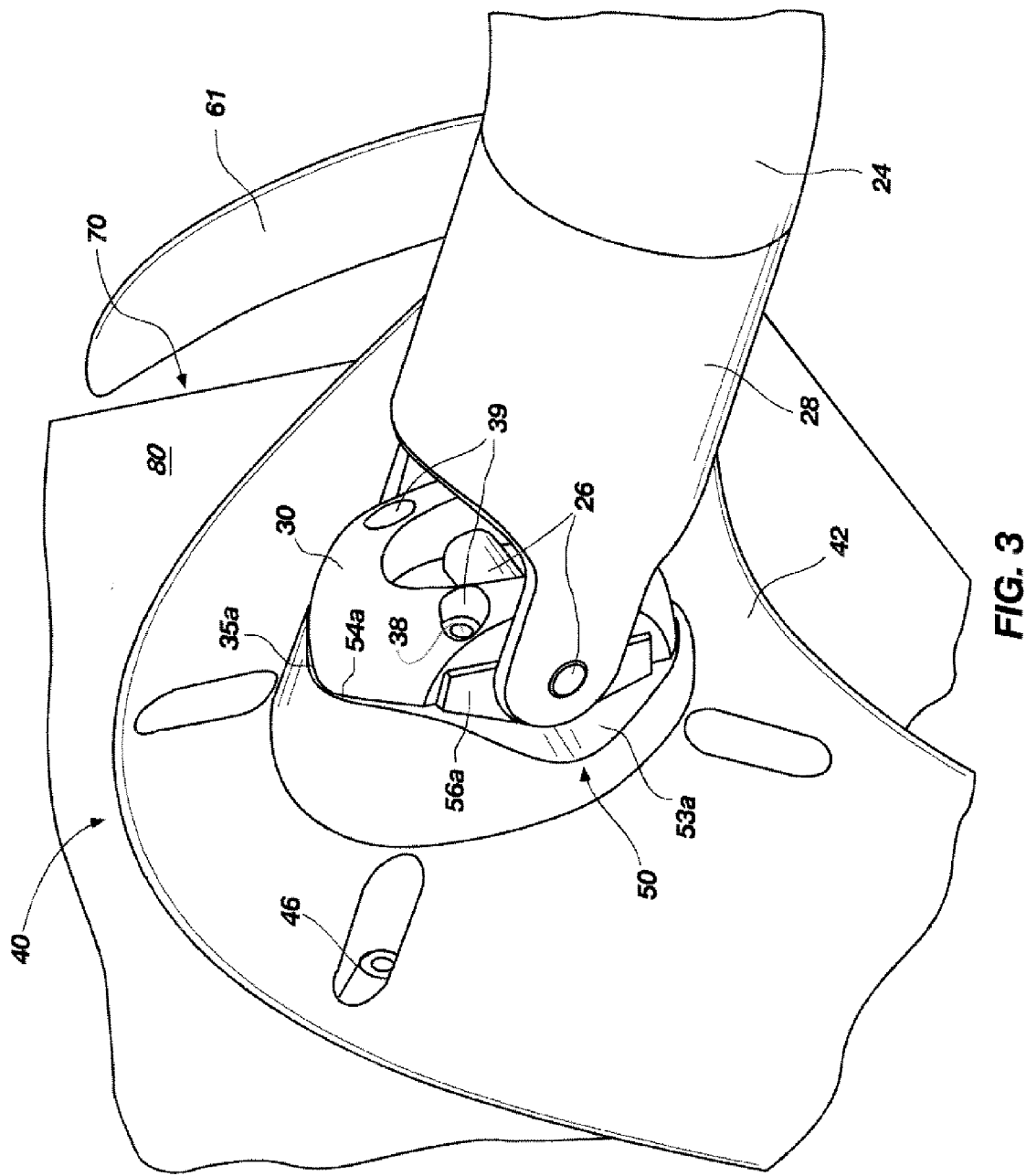
FIG. 3 is an enlarged perspective view of a portion of the assembly shown in FIG. 1, depicting another orientation in which the support of the assembly may be coupled to the extension arm.

With continued reference to FIG. 1, as well as to FIGS. 2A through 3, coupler 30 may be connected to second end 24 of extension arm 20 in any suitable manner known in the art. The connection between coupler 30 and second end 24 may be rigidly fixed, or it may provide for movement about one or more axes. FIG. 1 shows an embodiment in which a joint 28 can pivotally attach coupler 30 to second end 24. In a more specific embodiment, shown in FIGS. 2A and 3, joint 28 can be a substantially straight element that, when rotated relative to second end 24, may rotate a coupler 30 secured thereto (and, thus, a support 40 secured thereto, as well as a flat panel video monitor 70 secured to support 40) about substantially the same, fixed axis. FIG. 2C shows another embodiment, in which joint 28' can be a bent element (e.g., includes an angle, such as a 45°, 90°, or any other suitable or desirable angle). When joint 28' is rotated relative to second end 24, coupler 30 may move, or swing, along an arcuate path.

In the embodiments shown in FIGS. 1 through 3, coupler 30 is connected to joint 28 at second end 24 by a relatively simple, single-axis hinge 26. Hinge 26 can be disposed within and can extend through apertures 31a, 31b, that are formed as coupler 30 and an engagement element 50 on a yoke 42, or central region, of support 40 (see, e.g., FIGS. 4A through 4F, 5A, and 5B) are assembled with and secured to each other.

Figure 5:
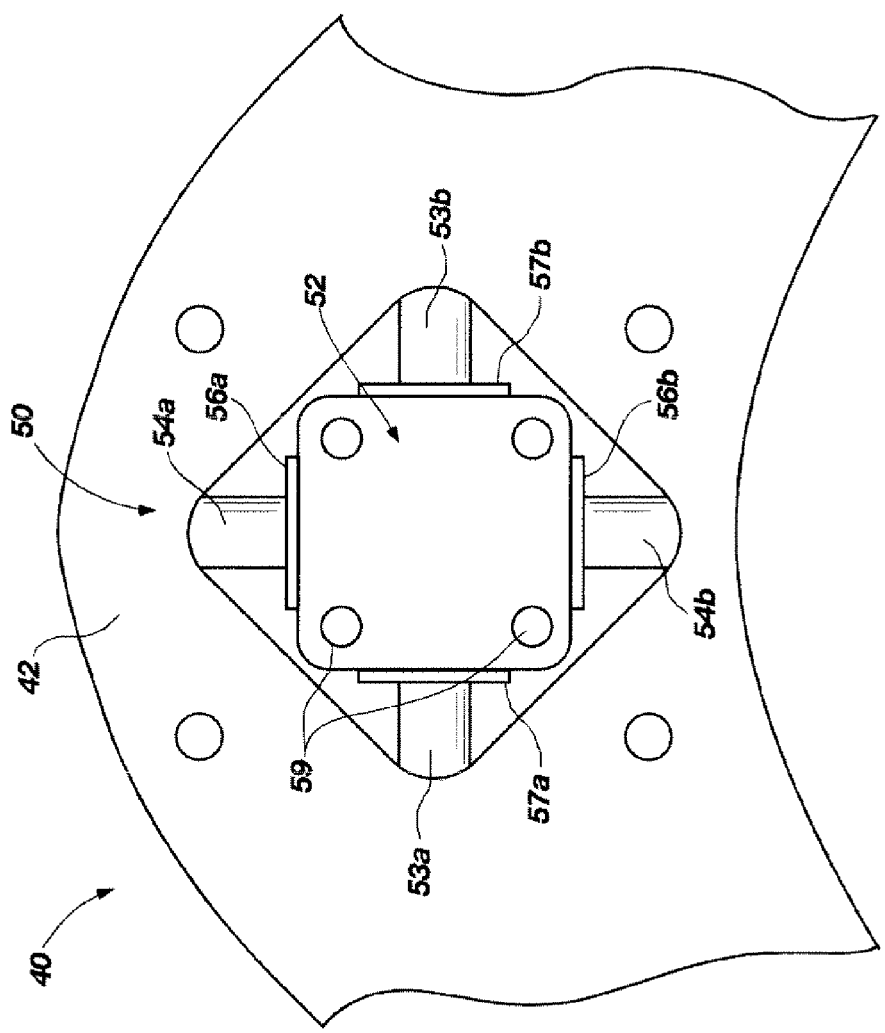
FIG. 5 is a plan view of an embodiment of an engagement element on a yoke of the support of the assembly shown in FIGS. 1 through 3.

As shown in FIGS. 2A and 3, in some embodiments hinge 26 may also pass through apertures formed through flanges 56a and 56b, 57a and 57b that protrude from an engagement element 50 on a yoke 42, or central region, of support 40 and, therefore, both connect second end 24 of extension arm 20 and coupler 30 to support 40 (see, e.g., FIGS. 2A, 3, and 5). Other types of connection elements, including, but not limited to, biaxial and multiaxial joints, may be used to secure coupler 30 to second end 24.

Coupler 30 can also be connected to support 40. More specifically, coupler 30 can be connected to an engagement element 50 on a yoke 42, or central portion, of support 40. In the embodiment depicted in FIGS. 4 and 5, coupler 30 includes an engagement edge 32 for interfacing with and engaging support 40. Engagement edge 32 may circumscribe a substantially hollow region 33 within coupler 30. Coupler 30 may be aligned between a pair of flanges 56a and 56b, or 57a and 57b of engagement element 50 (see e.g., FIGS. 2A, 3, and 5), while substantially hollow region 33 receives the other pair of flanges 57a and 57b or 56a and 56b.

Engagement edge 32 may include one or more engagement features 34. Each engagement feature 34 may have a configuration that facilitates proper alignment of coupler 30 with an engagement element 50 on yoke 42 of support 40. The configuration of engagement feature 34 may also prevent undesired movement of support 40 relative to coupler 30 and extension arm 20 (e.g., rotational displacement of support 40 relative to the axis of coupler 30). For the sake of clarity, since engagement feature 34 interacts with a corresponding feature on support 40, engagement feature 34 may also be referred to herein as a "support engagement feature."

For engagement feature 34 to facilitate alignment of coupler 30 with support 40 and to prevent undesired movement of support 40 relative to coupler 30, engagement element 50 of support 40 may include one or more engagement features 52, which may also be referred to herein as "coupler engagement features," that engage or are engaged by engagement feature 34 of coupler 30. For example, engagement feature 34 and engagement feature 52 may have complementary configurations (e.g., surface shapes, cross-sectional shapes, etc.).

Figure 4:
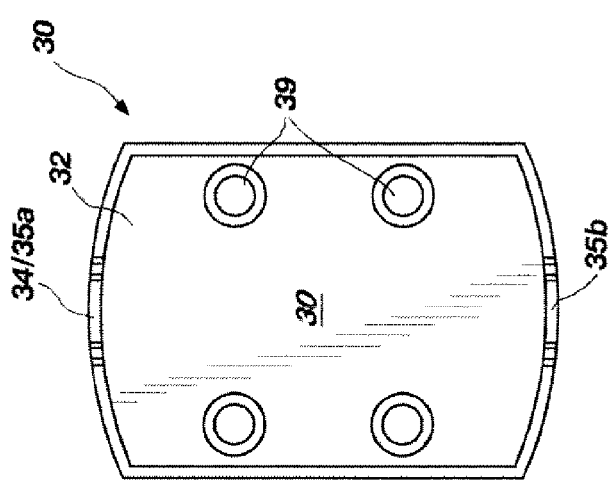
FIG. 4 is a plan view of an embodiment of an engagement surface of a coupler of the assembly shown in FIGS. 1 through 3.

Without limiting the scope of the invention, in one embodiment, engagement feature 34 includes at least two aligned protuberances 35a and 35b on opposite sides of engagement edge 32 (See FIG. 4). Protuberances 35a and 35b are aligned in a direction that is perpendicular to the axis along which hinge 26 extends. Gently sloped sidewalls of the depicted embodiment of protuberances 35a and 35b impart them with a cambered surface and an arched appearance. With reference to FIG. 5, an embodiment of an engagement feature 52 that engages each protuberance 35a, 35b is a recess 53a, 53b, 54a, 54b with a gently sloped surface that will receive at least a portion of a protuberance 35a, 35b.

In some embodiments, engagement features 34, 52 of one or both of coupler 30 and support 40 may be configured to enable multiple, discrete orientations of coupler 30 relative to support 40. Continuing with the nonlimiting example of the features of coupler 30 and support 40 shown in FIGS. 1 through 5, engagement feature 52 may include two pairs of recesses 53a, 53b and 54a, 54b that are located adjacent to opposite outside edges of corresponding pairs of flanges 57a, 57b and 56a, 56b, respectively, and that are aligned perpendicularly to one another. Each pair of recesses 53a, 53b and 54a, 54b is configured to receive protuberances 35a and 35b. When coupler 30 is secured to support 40 with protuberances 35a and 35b disposed within recesses 53a and 53b, as shown in FIG. 2A, hinge 26 allows support to pivot from side-to-side. Alternatively, when protuberances 35a and 35b are engaged by recesses 54a and 54b, as shown in FIG. 3, hinge 26 is oriented so support 40 can pivot from top-to-bottom.

At least one attachment element 38 secures coupler 30 to support 40. Attachment element 38 may permanently secure coupler 30 to support 40, or it may enable quick disengagement (partial or full) between coupler 30 and support 40 and reattachment of coupler 30 to support 40.

In an example of attachment element 38 that permanently secures coupler 30 to support 40, attachment element 38 may comprise one or more bolts or screws. Each attachment element 38 may extend through an aperture 39 formed through coupler 30 and engage both a feature of coupler 30 (e.g., a ledge of a larger countersunk aperture aligned with and at an opening of aperture 39) and a feature 58 of engagement element 50 (e.g., nuts aligned with holes 59 extending into engagement element 50 and retained in position relative to holes 59) of support 40. While this type of attachment is referred to herein as "permanent," it should be understood that, with the use of some non-minimal effort (e.g., unscrewing bolts or screw by hand or with tools), each attachment element 38 may be removed to disengage coupler 30 and support 40 from one another.

Of course, a wide variety of other known embodiments of suitable attachment elements 38 may instead be used to secure coupler 30 to support 40.

Since hinge 26 may extend through apertures 31 that are formed (by recesses 31a and 31b) as coupler 30 and coupler engagement element 50 are secured to one another, as in the embodiment depicted in FIGS. 4A through 4F, 5A and 5B, the tension on hinge 26 and, thus, the force that is required to tilt support 40 relative to coupler 30, may be adjusted by tightening and loosening attachment element 38. Tightening attachment element 38 increases friction on hinge 26, while loosening attachment element 38 reduces friction on hinge 26.

Thus, coupler 30 has at least two functions: (1) it enables reorientation of the axis about which support 40 pivots (e.g., between vertical and horizontal); and (2) it acts as a tilt-tensioning element.

With continued reference to FIGS. 1 through 3, support 40 may be secured to a back side 80 of a flat panel video monitor 70 by any suitable means for attachment 46, or "attachment element," known in the art. Means for attachment 46 may be configured to orient flat panel video monitor 70 in either a landscape orientation or a portrait orientation, or to enable reorientation of a flat panel video monitor 70 between the landscape and portrait orientations. Means for attachment 46 may include any of the numerous quick-release, quick-capture mechanisms that are known in the art, or much simpler apparatus, such as bolts or screws. In embodiments where screws are used, they may be inserted into apertures 48 that extend through yoke 42 and align with corresponding apertures (not shown) at back side 80 of flat panel video monitor 70. Without limiting the scope of the present invention, four apertures 48 may be arranged at the corners of a square or in any other arrangement that enables support 40 to be secured to back side 80 of flat panel video monitor 70 in two or more different orientations. The heads of such screws or bolts may be retained by ledges formed by countersinks that are aligned with and located at the openings of apertures 48. The threaded regions of screws may engage apertures that are formed in back side 80, whereas the threaded regions of bolts may engage threaded holes (complementary to the threading of the screws) of a support plate 82 of flat panel video monitor 70 (e.g., within flat panel video monitor 70, exposed at back side 80, etc.).

In some embodiments, support 40 may comprise a substantially unitary structure that includes an integral yoke 42 and handles 60, 61, as shown in FIGS. 1, 2B, 3 and 6. Without limiting the scope of the present invention, support 40 may be formed (e.g., molded, etc.) as a single piece. Alternatively, support 40 may be formed as two or more separate (e.g., front and back) shells, at least one of which includes parts of both yoke 42 and each handle 60, 61, that can be subsequently secured (e.g., cemented, welded, screwed, or otherwise bonded) to one another during manufacture, resulting in a somewhat hollow, relatively light-weight structure. For purposes of this disclosure, such an embodiment of support 40 is also considered to be a one-piece structure, as it may ultimately be supplied to a consumer in a simple to use, one-piece unit. A method for assembling a one-piece support 40 with a flat panel video monitor 70 includes rigidly securing yoke 42 of support 40 to back side 80 of flat panel video monitor 70.

Figure 6:
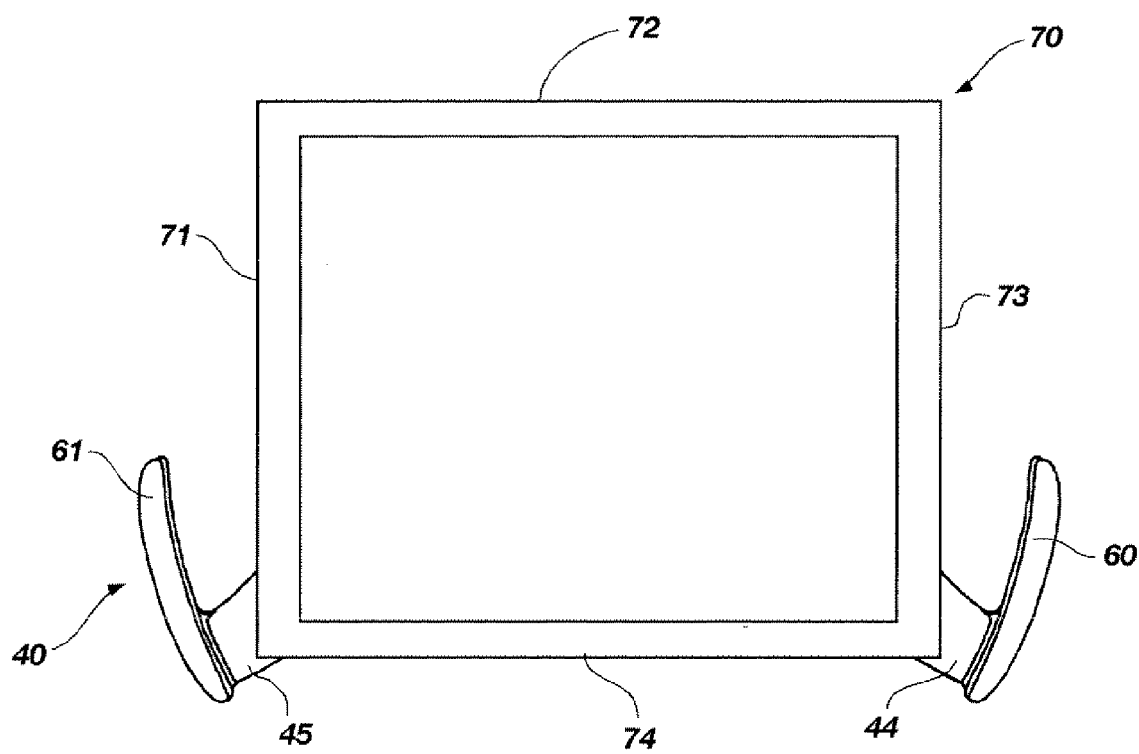
FIG. 6 is a frontal view of the support, which has been secured to a flat panel video monitor.

Continuing with reference to FIG. 1, and with reference to FIG. 6, in addition to yoke 42, support 40 includes one or more handles 60, 61 to facilitate movement of support 40 and of a flat panel video monitor 70 carried thereby.

In the depicted embodiment, yoke 42 has the appearance of an inverted "V," and includes two ends 44 and 45. Handles 60 and 61 extend from ends 44 and 45, respectively. As shown, each handle 60, 61 may be slightly, ergonomically curved for comfortable grasping. Each handle 60, 61 may be oriented and extend to a location that will enable a user to readily grip the same, and to easily move support 40 and the flat panel video monitor 70 carried thereby to any location and orientation permitted by extension arm 20 and coupler 30.

Figure 5A:
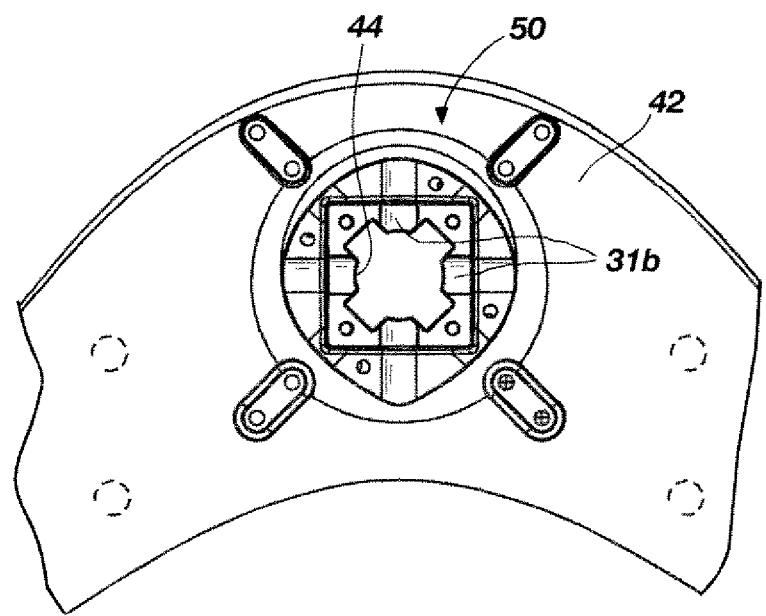
FIGS. 5A and 5B are different views of another embodiment of an engagement element on a yoke of the support of the assembly shown in FIGS. 1 through 3, which complement the embodiment of coupler shown in FIGS. 4A through 4F.
Figure 5B:
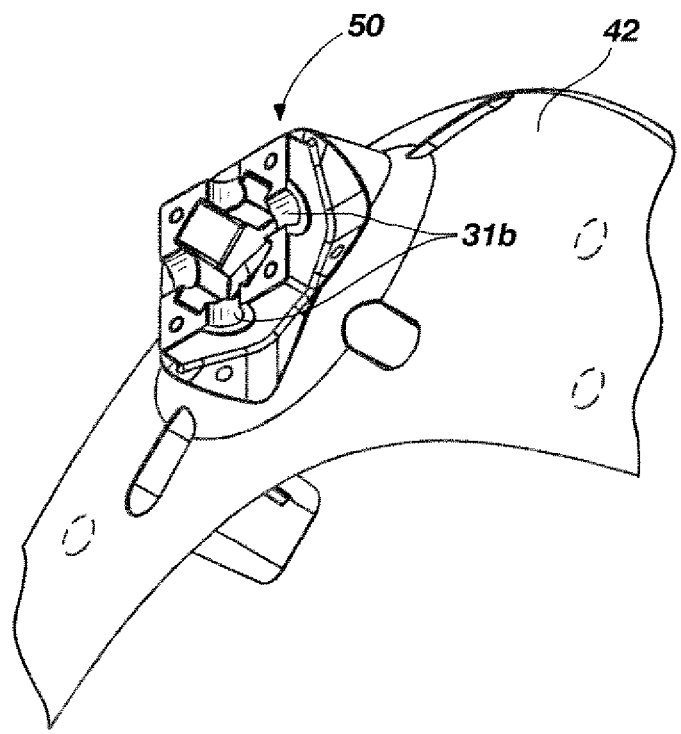

In a particular embodiment, the yoke 42 includes an aperture 44 and a hollow interior portion 44 that can be used as a wire passthrough and to hold portions of monitor wires, as depicted in FIG. 5A. In this fashion, the yoke 42 can conceal wiring that is disposed between the monitor 70 and extension arm 20, via the interior of yoke 42.

As depicted, handles 60 and 61 may protrude diagonally upward and outward from ends 44 and 45 of yoke 42. This arrangement imparts support 40 with the general appearance of the letter "W," with yoke 42 forming the center of the "W" and handles 60 and 61 forming the sides of the "W." When support 40 is assembled with a flat panel video monitor 70, handles 60 and 61 protrude diagonally beyond opposite outer peripheral edges 71 and 73 or 72 and 74 of flat panel video monitor 70.

Although the foregoing description includes many specifics, these should not be construed as limiting the scope of the present invention but, merely, as providing illustrations of some of the presently preferred embodiments. Similarly, other embodiments of the invention may be devised which do not depart from the scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby.

What is claimed is:

1. A support assembly, comprising:

a mounting element;

an elongate extension aria including a first end pivotally connected to the mounting element;

a coupler associated with a second end of the elongate extension arm, the coupler including a support engagement surface and at least one engagement feature having a length that extends across at least a portion of the support engagement surface, wherein the coupler and the coupler engagement element of the support are pivotably attached with a hinge that enables pivotal movement of the support and the coupler relative to the second end of the elongate extension arm, wherein the second end of the elongate extension arm comprises a joint that enables rotational movement of about an axis; and a support including opposite first and second surfaces, the first surface configured to be positioned against and secured directly to a back side of a supported element and the second surface including a coupler engagement element with at least one engagement feature configured to receive the at least one engagement feature of the coupler.

2. The support assembly of claim 1, wherein the at least one engagement feature of the coupler or the at least one engagement feature of the coupler engagement element of the support includes two engagement features that are perpendicularly oriented, each engagement feature of the coupler engagement element being configured to receive the at least one engagement feature of the coupler.

3. The assembly of claim 2, wherein the at least one engagement feature of the coupler comprises a pair of aligned protuberances and the coupler engagement element includes two pairs of recesses, which each pair of recesses being perpendicularly aligned to the other pair of recesses, and each recess being configured complementarily to a protuberance.

4. The assembly of claim 1, further comprising:
   at least one attachment element for securing the coupler to the coupler engagement element, wherein tightening of the at least one attachment element increases tension on the hinge and loosening of the at least one attachment element decreases tension on the hinge.

5. The assembly of claim 1, further comprising:
   the supported element secured to the support.

6. A support assembly, comprising:
   a mounting element;
   an elongate extension arm including a first end pivotally connected to the mounting element;
   a coupler associated with a second end of the elongate extension arm, the coupler including a support engagement surface and at least one engagement feature having a length that extends across at least a portion of the support engagement surface;
   a support including opposite first and second surfaces, the first surface configured to be positioned against and secured directly to a back side of a supported element and the second surface including a coupler engagement element with at least one engagement feature configured to receive the at least one engagement feature of the coupler, wherein rotation of a joint relative to the second end of the extension arm rotates the coupler and the support; and
   a joint between the second end of the elongate extension arm and the coupler, the joint being rotatably coupled to the second end.

7. The assembly of claim 6, wherein the joint includes a bend and rotation of the joint relative to the second end of the elongate extension arm moves the coupler and the support along an arcuate path.

8. The assembly of claim 6, wherein the joint is substantially straight, and rotation of the joint relative to the second end of the extension arm rotates the coupler and the support about a substantially fixed axis.

9. A coupler for changing an orientation axis of rotation of a flat panel video monitor, comprising:
   a body including a support engagement surface configured for placement against a coupler engagement surface of a support;
   at least one engagement feature on the support engagement surface having a length that extends across at least a portion of the support surface for engaging at least one engagement feature in the coupler engagement surface to fix an orientation of the coupler relative to the support;
   at least one attachment element for securing the coupler to the support; and
   at least one attachment configured for insertion into and through at least one hole through the body of the support engagement surface to enable engagement of a corresponding feature of the support.

* * * * *